(12) United States Patent
Liu

(10) Patent No.: US 7,355,930 B2
(45) Date of Patent: Apr. 8, 2008

(54) METHOD OF OPENING/CLOSING A DISK TRAY IN A DISK DRIVE

(75) Inventor: Yu-Chih Liu, Taipei (TW)

(73) Assignee: Ulead Systems, Inc., Taipei (TW)

( * ) Notice: Subject to any disclaimer, the term of this patent is extended or adjusted under 35 U.S.C. 154(b) by 610 days.

(21) Appl. No.: 10/700,556

(22) Filed: Nov. 5, 2003

(65) Prior Publication Data

US 2005/0094504 A1    May 5, 2005

(51) Int. Cl.
G11B 17/03    (2006.01)

(52) U.S. Cl. ............. 369/30.31; 720/606; 720/619; 720/601

(58) Field of Classification Search ................ None
See application file for complete search history.

(56) References Cited

U.S. PATENT DOCUMENTS

| | | | |
|---|---|---|---|
| 5,813,613 A * | 9/1998 | Keenan et al. ............ | 239/676 |
| 5,831,613 A * | 11/1998 | Johnston et al. ............ | 715/771 |
| 6,157,618 A * | 12/2000 | Boss et al. ................ | 370/252 |
| 6,243,347 B1 * | 6/2001 | Kawana et al. ............ | 720/646 |
| 6,414,927 B1 * | 7/2002 | Ota ...................... | 369/53.41 |
| 6,515,951 B1 * | 2/2003 | Oh ....................... | 369/53.37 |

FOREIGN PATENT DOCUMENTS

JP    2003281806 A  * 10/2003

* cited by examiner

*Primary Examiner*—William Korzuch
*Assistant Examiner*—Tawfik Goma
(74) *Attorney, Agent, or Firm*—Birch, Stewart, Kolasch & Birch, LLP

(57) ABSTRACT

A method for opening/closing a disk tray of a disk drive. The method includes the steps of when a first event occurs, sending a load/unload command to the disk drive, to which the disk drive responds with a second or third event, and resends the load/unload command to the disk drive when the disk drive responds to the previous load/unload command with the second event.

10 Claims, 7 Drawing Sheets

METHOD OF OPENING/CLOSING A DISK TRAY IN A DISK DRIVE

BACKGROUND OF THE INVENTION

1. Field of the Invention

The present invention relates to the operation of a disk drive and particularly to a method of opening/closing a disk tray in the drive.

2. Description of the Related Art

The ATA/IDE interface has become a de facto industry standard for connection of disk drives in PC's. In the interest of simplicity and cost, the ATA/IDE interface was originally designed to support only a small subset of computer peripherals. The expanding use of multimedia, inexpensive program distribution on CD ROM, and faster and more powerful systems has created the need for enhancements to ATA. The ATAPI CD-ROM specification SFF-8020 is one of those enhancements and provides a simple and inexpensive CD-ROM interface through a superset of ATA.

Software applications involving a disk drive load/unload operation, such as those for CD burning or playback, provide a graphical load/eject button, whereby the disk tray can opened or closed by clicking a mouse rather than pressing the physical load/eject button on the front panel of the disk drive. When the load/eject button is clicked, the status of the disk tray must be acquired to determine whether the load or unload operation is intended. However, the SFF-8020 specification does not define any packet command for acquisition of the disk tray status.

Traditionally, an even and odd flag are raised when the load/eject button has been clicked an even and odd number of times, respectively. The raised even flag indicates that the disk tray is open while the raised odd flag indicates the disk tray is closed. However, since the flag is used locally in only one application, an incorrect disk tray status indication is possible when another application is performing a load/unload operation or the physical load/eject button on the front panel of the disk drive is pressed, as shown in FIG. 1A~1E. The disk tray is initially closed, as shown in FIG. 1A. The graphical load/eject button is clicked and the disk tray is opened, as shown in FIG. 1B. When the graphical load/eject button is clicked again, the disk tray is closed, as shown in FIG. 1C. The user presses the physical load/eject button on the disk drive to open the disk tray, as shown in FIG. 1D. Since the graphical load/eject button is not clicked, the even flag is kept raised and wrongly indicates that the disk tray is closed. Thus, when the graphical button is clicked a third time, the disk drive receives a command to open the already open disk tray, which results in no operation as shown in FIG. 1E.

To solve this problem, the new SFF-8090 specification defines several packet commands for acquisition of the disk tray status, such as Mechanism Status and Get Notification. However, software applications using these newly defined commands are not applicable to all disk drives, exceptions include the IsoBuster which has not adopted the SFF-8090 standard.

SUMMARY OF THE INVENTION

The object of the present invention is to provide a method of opening/closing the disk tray, including calculating the time elapsed between sending of the Load/Unload Medium command and receiving the returned value from the disk drive. This elapsed time period, instead of the flag used in the traditional method, indicates the disk tray status. Thus, the method of the present invention eliminates the problem caused by the local flag and is applicable to any disk drive.

The present invention provides a method of opening/closing a disk tray in a disk drive, comprising the steps of when opening or closing operation of the disk tray is requested, sending a first load/unload command to the disk drive, and when the disk drive responds the command within a threshold period following the sent command, sending a second unload/load command which reverses the operation triggered by the first load/unload command applied to the disk drive.

The present invention also provides another method of opening/closing a disk tray in a disk drive, comprising the steps of when opening or closing of the disk tray is requested, sending a first load/unload command to the disk drive and recording a corresponding clock value that corresponds to a time point of sending the first command, receiving a value returned by the disk drive for the load/unload command and recording a corresponding clock value that corresponds to a time point of receiving the returned value, calculating a time period from the sending of the first command to the receiving of the returned value, and resending a second unload/load command which reverses the operation triggered by the first load/unload command applied to the disk drive when the calculated time period is shorter than or equal to a threshold time.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 3:
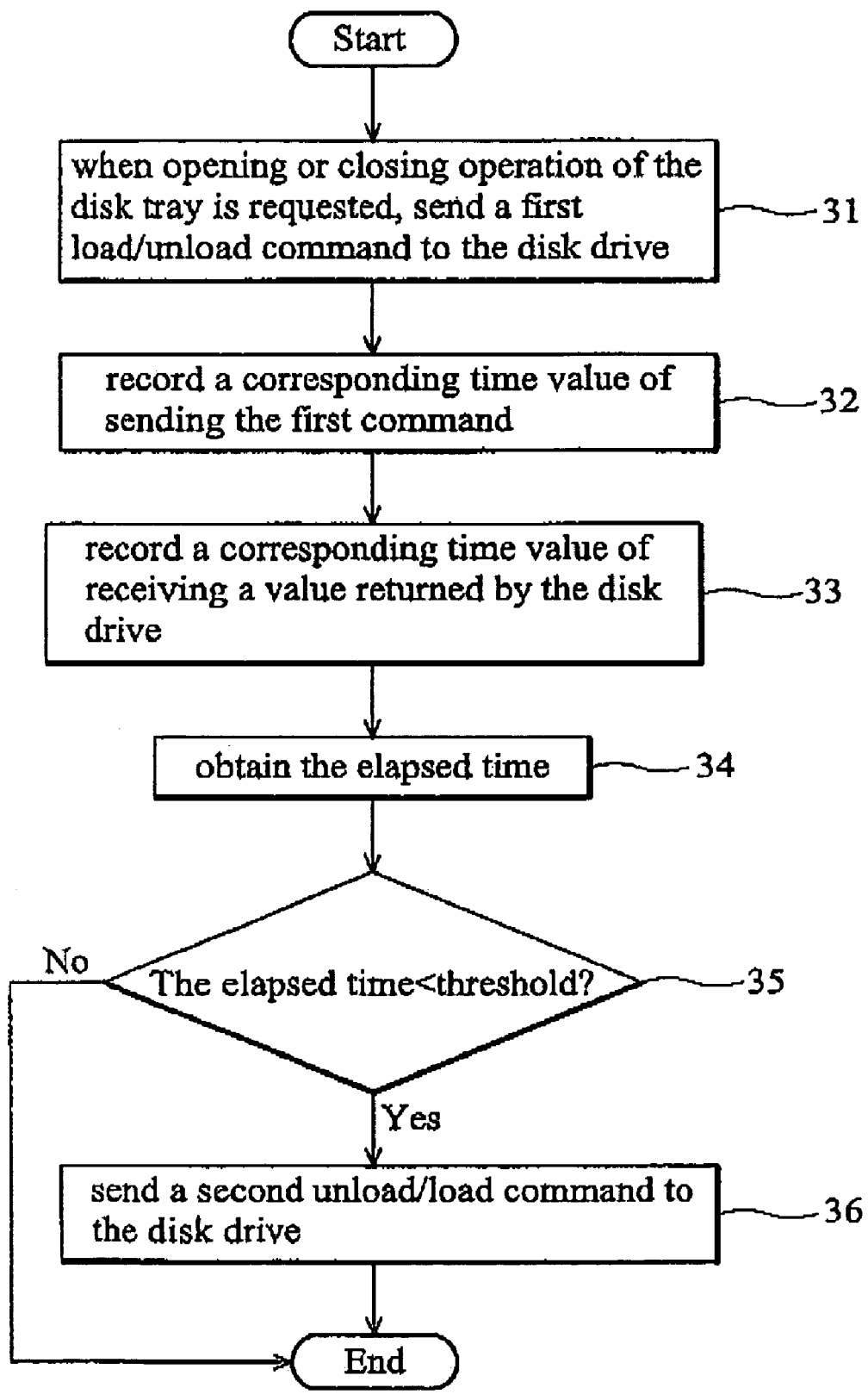
FIG. 3 is a flowchart of a method of opening/closing a disk tray in a disk drive according to one embodiment of the invention.

FIG. 3 is a flowchart of a method of opening/closing a disk tray in a disk drive according to one embodiment of the invention.

In step 31, when opening or closing of the disk tray is requested, such as clicking the graphical the load/eject button, a first command Load/Unload Medium defined in SFF-8020 or SFF-8090 is sent to the disk drive. Accordingly, the disk drive may respond immediately or after a long period.

In step 32, a first clock time value corresponding to the time when the first command Load/Unload Medium being sent is recorded. This can be done by a Windows function:

GetTickCount. The returned value for the function GetTickCount is stored into a variable OLD, i.e., OLD=GetTickCount( ).

In step 33, a second time value corresponding to the time when the returned value for the command Load/Unload Medium being received is recorded. This can be achieved by the Windows function GetTickCount. The returned value for the function GetTickCount is stored into a variable NEW, i.e., NEW=GetTickCount( ).

In step 34, a difference between the first and second time value is calculated as the elapsed time and, accordingly the time period from the sending of the load/unload command to the receiving of the returned value is obtained.

In step 35, the time period obtained in step 34 is compared with a threshold period, such as 0.5 seconds. The comparison result determines whether the disk drive responds by sending back the returned value from the disk drive after a significantly long time period (i.e., longer than the threshold) or immediately (i.e., after a time period shorter than the threshold).

In step 36, a second instance of the command Load/Unload Medium is sent to the disk drive when the disk drive responds to the previous Load/Unload Medium command within the threshold period, i.e., the disk drive sends back the returned value immediately.

Figure 1A:
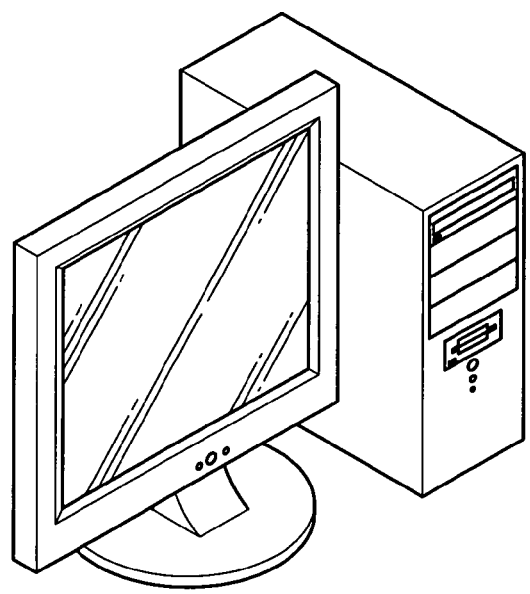
FIG. 1A~1E are diagrams showing the traditional opening/closing of the disk tray.
Figure 1B:
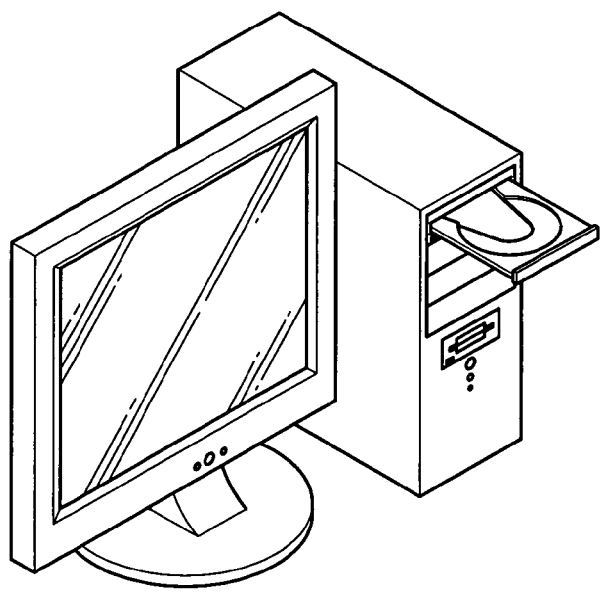
Figure 1C:
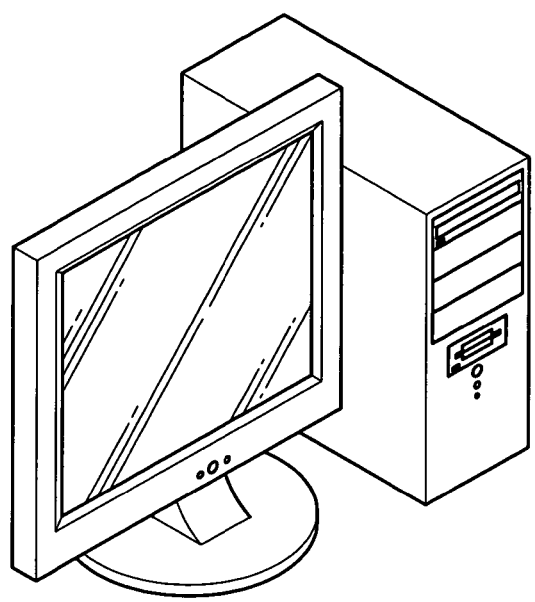
Figure 1D:
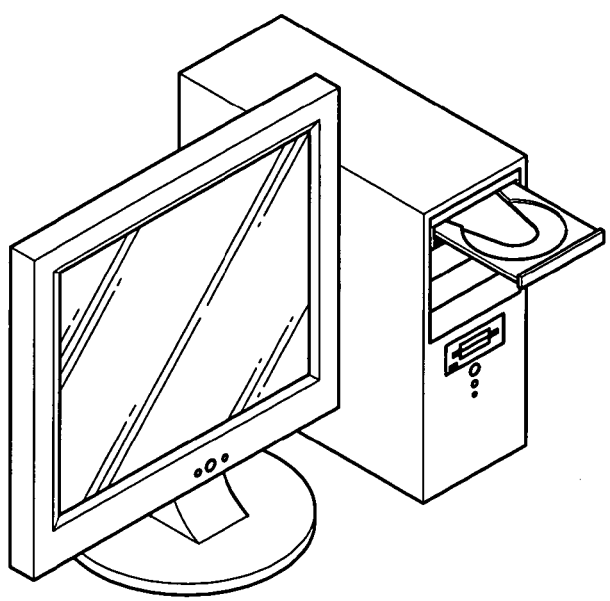
Figure 1E:
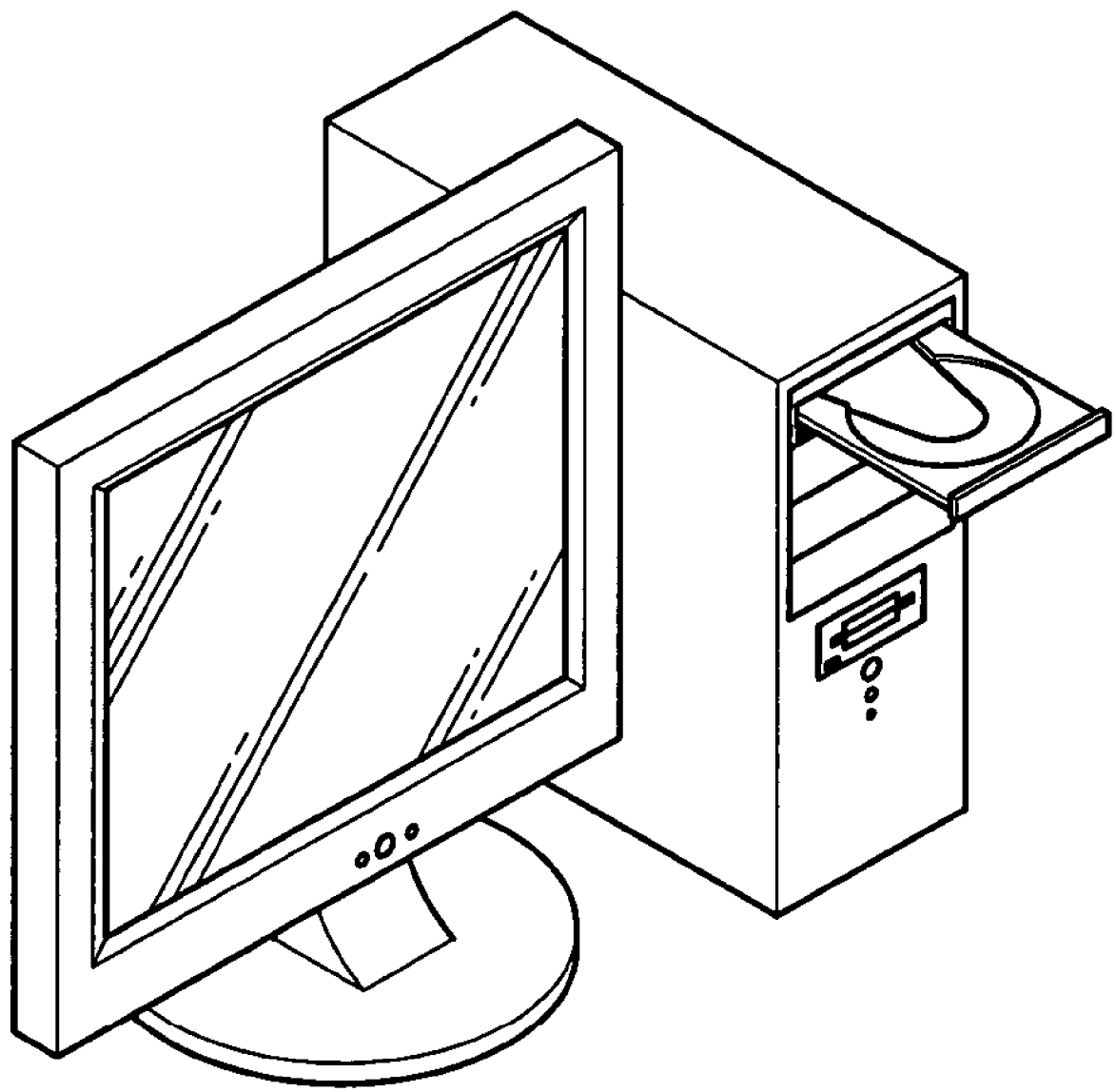
Figure 2A:
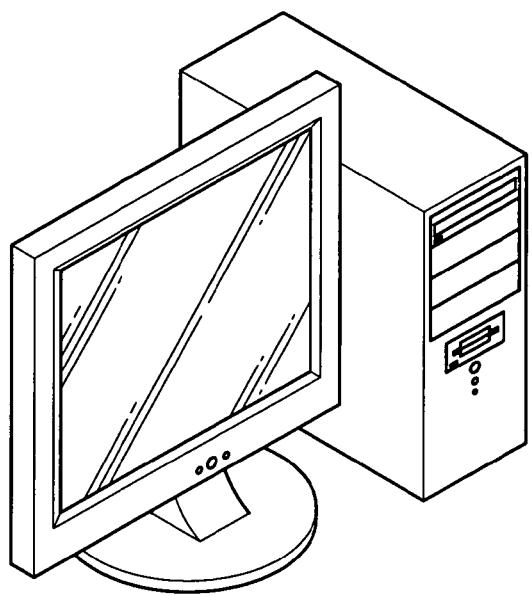
FIG. 2A~2E are diagrams showing the opening/closing of the disk tray according to one embodiment of the invention.
Figure 2B:
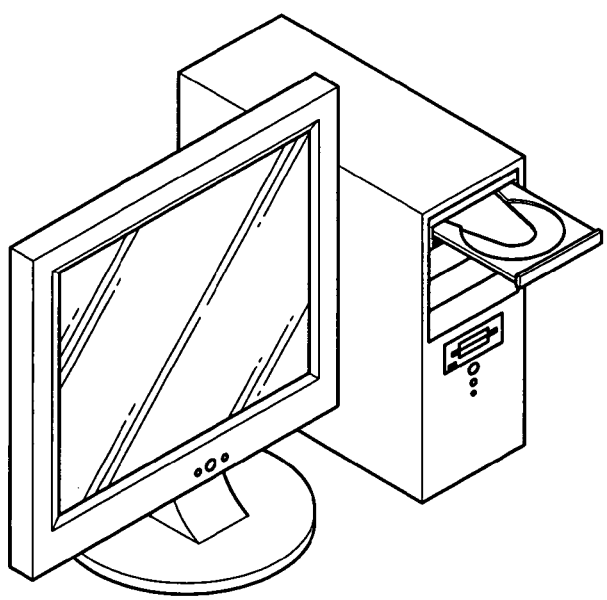
Figure 2C:
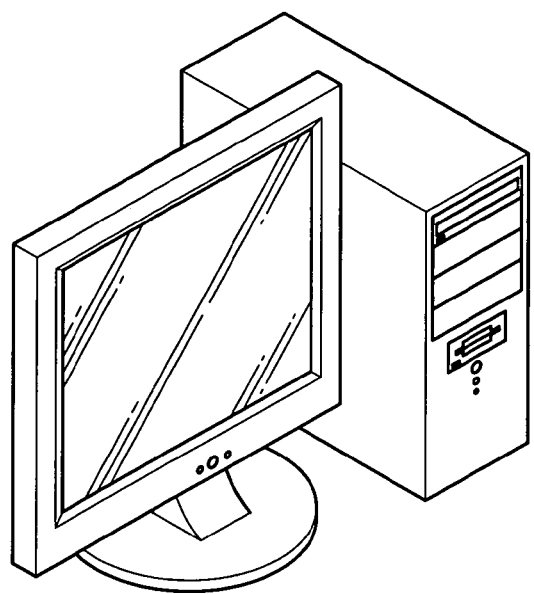
Figure 2D:
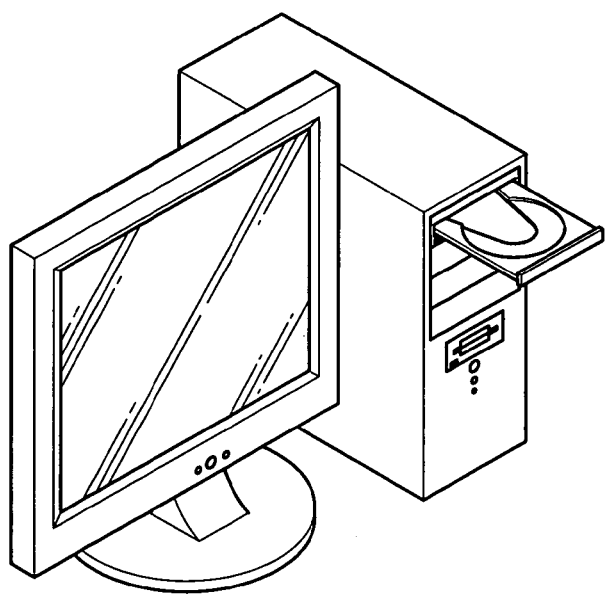
Figure 2E:
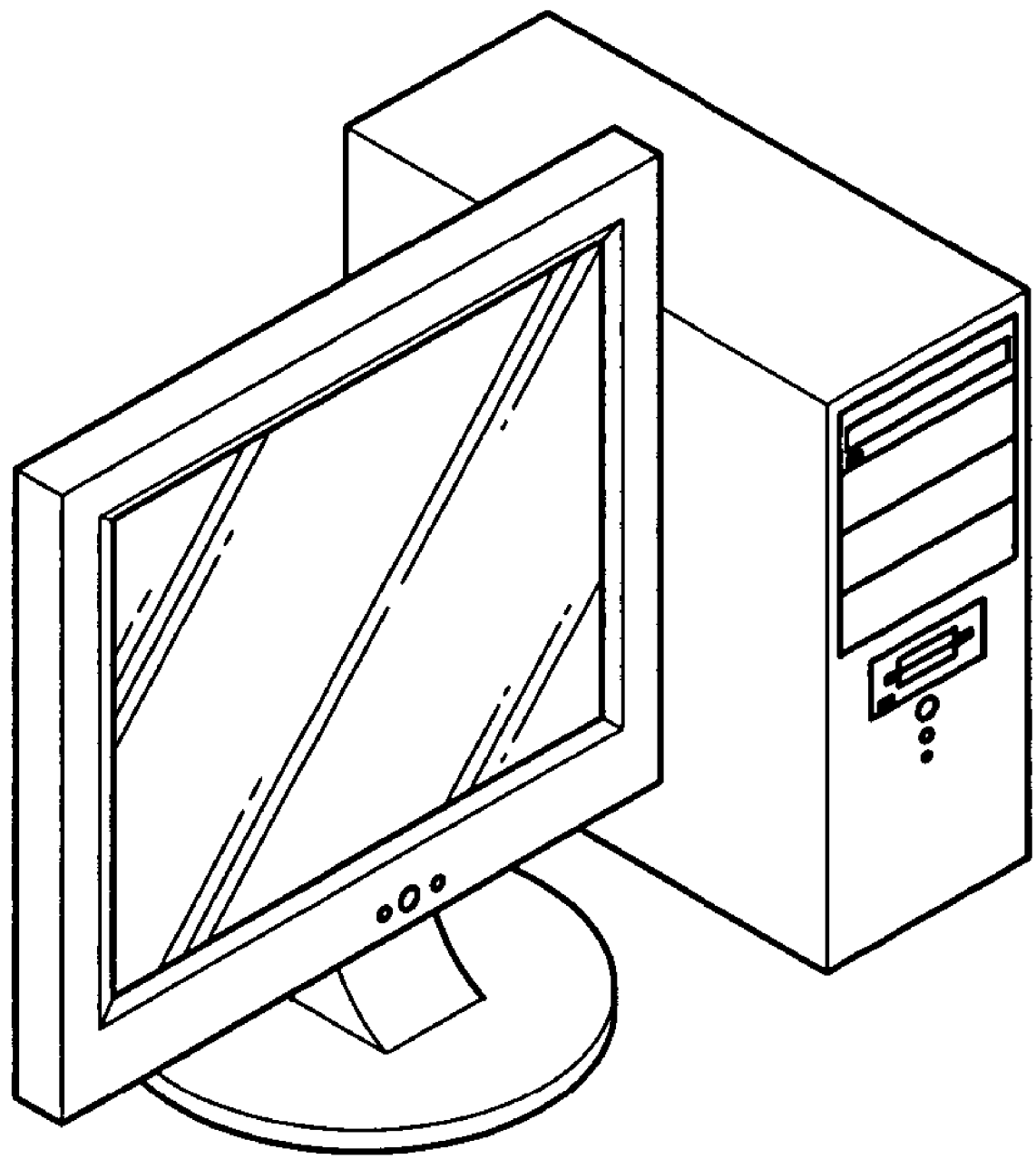

FIGS. 2A~2E are diagrams showing the opening/closing of the disk tray according to one embodiment of the invention. The disk tray is initially closed, as shown in FIG. 2A. When the graphical load/eject button is clicked, the disk tray moves outwards and the returned value is not sent back until the disk tray stops, as shown in FIG. 2B. Since the returned value is received after a time period longer than 0.5 second, the command Load/Unload Medium is not resent. As shown in FIG. 2C, the graphical load/eject button is clicked again, the disk tray moves inwards, and the returned value is not sent back until the disk tray stops. As shown in FIG. 2D, the user presses the physical load/eject button on the disk drive to open the disk tray. When the user clicks the graphical button at the third time, the disk drive receives the Load/Unload Medium command to open the opened disk tray, which results in no operation. Thus, the returned value is immediately sent back so that the command Load/Unload Medium is resent to close the disk tray, as shown in FIG. 2E.

In conclusion, the present invention provides a method of opening/closing the disk tray, including calculating the elapsed time period from the sending of the Load/Unload Medium command to the receiving of the returned value from the disk drive. This elapsed time period, instead of the flag used in the traditional method, indicates the disk tray status. Thus, the method of the present invention eliminates the problem caused by the local flag and is applicable to any kind of disk drive.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method of opening/closing a disk tray in a disk drive, comprising the steps of:

when opening or closing operation of the disk tray is requested, sending a first load/unload command to the disk drive to trigger an operation of opening or closing the disk tray and recording a time value that corresponds to a time point of sending the first command;

receiving a value returned by the disk drive for the first load/unload command and recording a time value that corresponds to a time point of receiving the returned value; and calculating a period of time from the sending of the first load/unload command to the receiving of the returned value; and when the calculated period of time is smaller than or equal to a threshold period, sending a second unload/load command to the disk drive, wherein the second unload/load command reverses the operation triggered by the first unload/load command applied to the disk drive.

2. The method as claimed in claim 1, wherein the opening or closing of the disk tray is requested by utilizing an input device.

3. The method as claimed in claim 1, wherein when the calculated period of time is greater than a threshold period, the first load/unload command is executed by the disk drive to be completed.

4. The method as claimed in claim 1, wherein the load/unload command is defined by the ATAPI CD-ROM specification SFF-8020.

5. The method as claimed in claim 1, wherein the threshold period is 0.5 second.

6. A method of opening/closing a disk tray in a disk drive, comprising the steps of:

when opening or closing of the disk tray is requested, sending a first load/unload command to the disk drive to trigger an operation of opening or closing the disk tray and receiving a value returned by the disk drive for the first load/unload command;

calculating a time period from the sending of the first toad/unload command to the receiving of the returned value; and sending a second unload/load command to the disk drive to reverse the operation triggered by the first load/unload command when the calculated time period is shorter than a threshold.

7. The method as claimed in claim 6, wherein the opening or closing of the disk tray is requested by utilizing an input device.

8. The method as claimed in claim 6, wherein the calculating of the time period comprises the steps of:

recording a first clock value corresponding to the time when the first load/unload command is sent;

recording a second clock value corresponding to the time when the returned value is received; and obtaining the time period according to a difference between the first and second clock value.

9. The method as claimed in claim 6, wherein the threshold is about 0.5 second.

10. The method as claimed in claim 6, wherein the load/unload command is defined by the ATAPI CD-ROM specification SFF-8020.

* * * * *